US011442886B2

(12) United States Patent
Jacobs et al.

(10) Patent No.: US 11,442,886 B2
(45) Date of Patent: Sep. 13, 2022

(54) COMMUNICATION APPARATUS CAPABLE OF IMPLEMENTING A SELECTED COMMUNICATION PROTOCOL

(71) Applicant: IOT.nxt BV, The Hague (NL)

(72) Inventors: Gysbert Johannes Jacobs, Centurion (ZA); Rudi Deodat Du Toit, Centurion (ZA)

(73) Assignee: IOT.nxt BV, The Hague (NL)

( * ) Notice: Subject to any disclaimer, the term of this patent is extended or adjusted under 35 U.S.C. 154(b) by 0 days.

(21) Appl. No.: 16/972,214

(22) PCT Filed: Jun. 7, 2019

(86) PCT No.: PCT/IB2019/054761
§ 371 (c)(1),
(2) Date: Dec. 4, 2020

(87) PCT Pub. No.: WO2019/234698
PCT Pub. Date: Dec. 12, 2019

(65) Prior Publication Data
US 2021/0224217 A1    Jul. 22, 2021

(30) Foreign Application Priority Data
Jun. 8, 2018    (ZA) .................................. 2018/03814

(51) Int. Cl.
*G06F 13/42*    (2006.01)
*G06F 13/38*    (2006.01)
*H04L 69/08*    (2022.01)

(52) U.S. Cl.
CPC .......... *G06F 13/4282* (2013.01); *H04L 69/08* (2013.01); *G06F 2213/0042* (2013.01)

(58) Field of Classification Search
CPC ......... G06F 13/4282; G06F 2213/0042; G06F 13/385; H04L 69/08
See application file for complete search history.

(56) References Cited

U.S. PATENT DOCUMENTS 5,854,904 A * 12/1998 Brown .................. G06F 13/409
706/45
7,730,242 B2 * 6/2010 Tsuchiya ............... G06F 13/385
710/72

(Continued)

FOREIGN PATENT DOCUMENTS

CN    107624183 A    1/2018
WO    WO2018042402 A1    3/2018

OTHER PUBLICATIONS

First Office Action for Chinese Application No. 201980051245.8 dated Apr. 25, 2022, with its English translation, 52 pages.

*Primary Examiner* — Idriss N Alrobaye
*Assistant Examiner* — Henry W Yu
(74) *Attorney, Agent, or Firm* — Bret E. Field; Bozicevic, Field & Francis LLP

(57) ABSTRACT

A communication apparatus is disclosed with a communication controller that has a host-side communication interface for communicating with a host and a plurality of slave-side communication interfaces. Each slave-side communication interface has a plurality of electrical pins that are configurable to define a communication port that implements a selected communication protocol thereon. Each pin is in electrical communication with a slave socket having a predetermined layout. Each slave socket is configured to receive a protocol adapter that corresponds to the selected communication protocol and that is configured to facilitate communication between an external slave device and the relevant communication port.

17 Claims, 3 Drawing Sheets

(56) References Cited

U.S. PATENT DOCUMENTS

| | | | | |
|---|---|---|---|---|
| 7,814,255 B1* | 10/2010 | Deva | ................... | G06F 13/4081 |
| | | | | 710/10 |
| 7,865,629 B1* | 1/2011 | Tantos | ................ | G06F 13/4068 |
| | | | | 710/11 |
| 7,956,618 B2* | 6/2011 | Lundquist | .......... | H01R 13/7039 |
| | | | | 324/538 |
| 8,634,304 B2* | 1/2014 | Motter | .................. | H04L 12/462 |
| | | | | 370/242 |
| 9,047,222 B2* | 6/2015 | Chandra | ............ | H04Q 11/0062 |
| 9,514,066 B1 | 12/2016 | Diaz et al. | | |
| 2004/0122649 A1 | 6/2004 | Bartek et al. | | |
| 2006/0015673 A1* | 1/2006 | Morrow | ................ | G06F 13/387 |
| | | | | 710/315 |
| 2006/0294272 A1* | 12/2006 | Chou | .................... | H01R 27/02 |
| | | | | 710/62 |
| 2009/0257754 A1* | 10/2009 | Theodoras, II | ......... | H04L 49/30 |
| | | | | 398/135 |
| 2009/0271556 A1* | 10/2009 | Rutherford, III | ... | G06F 13/4022 |
| | | | | 710/313 |
| 2013/0091308 A1* | 4/2013 | Cha | ......................... | H04L 69/18 |
| | | | | 710/11 |
| 2013/0117470 A1* | 5/2013 | Terlizzi | .................. | G01R 31/08 |
| | | | | 710/3 |
| 2013/0159559 A1* | 6/2013 | Hess | ..................... | G06F 13/385 |
| | | | | 710/14 |
| 2013/0205054 A1* | 8/2013 | Wright | .................... | H02M 1/08 |
| | | | | 710/105 |
| 2014/0075069 A1* | 3/2014 | Mullins | ............... | G06F 13/4286 |
| | | | | 710/106 |
| 2015/0067206 A1 | 3/2015 | Luo et al. | | |
| 2015/0370751 A1* | 12/2015 | Perrine | ............... | G06F 13/4068 |
| | | | | 710/106 |

\* cited by examiner

US 11,442,886 B2

COMMUNICATION APPARATUS CAPABLE OF IMPLEMENTING A SELECTED COMMUNICATION PROTOCOL

CROSS-REFERENCE TO RELATED APPLICATION

This application claims priority from South African provisional patent application number 2018/03814 filed on 8 Jun. 2018, which is incorporated by reference herein.

FIELD OF THE INVENTION

This invention relates to a communication apparatus. It finds particular application, although in no way exclusive, in its use to facilitate communication between Internet of Things (IoT) edge routers and IoT end-node devices.

BACKGROUND TO THE INVENTION

The "Internet of Things" or "IoT" is a term relating to a network of billions of physical electronic devices that are connected to the internet. Historically, mostly computing devices with high computing power and connectivity were considered to be "connected" to and thus accessible via the internet. However, the "things" in "Internet of Things" include devices previously generally considered to be stand-alone and often unintelligent devices. As such, IoT devices may include devices as simple as a residential light switch or a pressure sensor on an industrial boiler.

The industrial application of IoT is practically limitless and continues to revolutionise industry through real-time remote monitoring and control. However, to enable the integration of such a variety of devices into an IoT network, it is necessary to provide an interface to which these "things" or "end-nodes" can be connected for facilitating communication therewith. These interface devices are referred to as "IoT edge-routers".

With the kinds of devices connectable through IoT being so numerous, the variety of communication protocols and hardware interfaces of the end-nodes are equally large in number. Commercially available edge routers are generally provided with a fixed number of communication ports, for example 2 Universal Serial Bus (USB) ports and 2 universal asynchronous receiver-transmitter (UART) ports, which may operate using either RS-232 or RS-485 protocols. Especially on installations with legacy devices, the communication ports of a particular edge router may be inadequate for interfacing with these legacy devices.

The Applicant thus considers there to be room for improvement.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY OF THE INVENTION

In accordance with an aspect of the invention there is provided a communication apparatus including a communication controller having a host-side communication interface for communicating with a host and a plurality of slave-side communication interfaces, each slave-side communication interface having a plurality of electrical pins that are configurable to define a communication port that implements a selected communication protocol thereon, and each pin further being in electrical communication with a slave socket having a predetermined layout, wherein each slave socket is configured to receive a protocol adapter that corresponds to the selected communication protocol, the protocol adapter being configured to facilitate communication between an external slave device and the relevant communication port.

Further features provide for the communication controller to be configured to send data received through the host-side communication interface to a particular slave-side communication interface port for sending to a slave device; and for the communication controller to be configured to send data received from a slave device through a slave-side port to the host-side communication interface for sending to a host.

In one embodiment the communication controller may be a microprocessor that is configured to implement a plurality of slave-side communication interfaces thereon; in another embodiment the communication controller is a communication bridge integrated circuit, for example an FTDI™ model FT4232 integrated circuit.

Further features provide for each slave-side communication interface to be configurable to define a communication port that implements a selected communication protocol thereon on the fly; for the communication controller to be in communication with a non-volatile electronic memory for storage of a particular communication interface configuration; for the non-volatile electronic memory to be an electrically erasable programmable read-only memory (EEPROM); and for the communication controller to be arranged to restore a stored communication interface configuration at start-up.

Further features provide for the host-side communication interface to be a USB interface; for the communication apparatus to have an identifier stored thereon to enable a host to identify it as a particular apparatus to be configured; for the USB host-side communication interface to provide a USB hub to facilitate the connection of further USB devices to the same USB bus; for the further USB devices to be further communication apparatuses; and for the USB hub to be a powered USB hub.

Further features provide for each slave-side communication interface to be an 8-bit interface having 8 electrical pins; for a slave-side communication interface to be configurable to define more than one communication port; and for the selected protocol implemented on each communication port defined on each of the slave-side communication interfaces to be selected from the group consisting of a serial peripheral interface (SPI) protocol, an inter-integrated circuit ($I^2C$™) protocol or a two-wire interface (TWI) protocol, a 1-wire interface protocol, a JTAG protocol, a universal asynchronous receiver-transmitter (UART) protocol, a controller area network (CAN) bus protocol, and a binary protocol; for a protocol adapter to be arranged to convert the slave-side interface signals to RS-232 standard, RS-485 standard and the like; and for a protocol adapter to be arranged to convert an analogue signal of a slave device to digital data and to communicate it to the slave-side communication interface by means of a digital communication protocol.

Further features provide for each slave socket to allow a protocol adapter to be removably received therein; for the layout of each protocol adapter to at least partially correspond with the layout of the slave socket; and for protocol adapters to be interchangeable between at least a subset of the slave sockets.

Further features provide for each protocol adapter to be arranged to convert communication signals of a slave device to be electrically compatible with the slave-side communication interfaces; for each protocol adapter to be arranged to convert communication signals of a slave-side communication interface to be electrically compatible with a slave device; for a slave-side facing section of the slave socket to be in electrical communication with an electromechanical connector to allow a slave device to be electrically connected thereto.

In accordance with another aspect of the invention there is provided a computer-implemented method for configuring a communication apparatus, the method executed at a host and comprising:

sending a configuration instruction to a communication controller of the apparatus, the configuration instruction including a selected communication protocol identifier;

causing the communication controller to configure electrical pins of a slave-side communication interface thereof to define a communication port and to implement a communication protocol thereon that corresponds to the communication protocol identifier, the pins of the slave-side communication interface being in electrical communication with a slave socket having a predetermined layout;

whereby communication is facilitated between the communication port and an external slave device by a protocol adapter corresponding to the selected communication protocol that is received within the slave socket.

Further features provide for the step of sending a configuration instruction to be preceded by the step of receiving an apparatus identifier from the communication apparatus; for the step of sending a configuration instruction to be preceded by the step of receiving a current configuration message from the communication apparatus that indicates a current slave-side communication interface configuration of the communication apparatus; and for the configuration instruction to include the apparatus identifier, the communication apparatus being arranged to identify the configuration instruction as being addressed to it by means of the apparatus identifier therein.

Further features provide for the step of causing the communication controller to configure electrical pins of a slave-side communication interface to include causing the communication controller to configure more than one communication port thereon; to include causing the communication controller to implement a protocol on each communication port selected from the group consisting of a serial peripheral interface (SPI) protocol, an inter-integrated circuit (I2C™) protocol or a two-wire interface (TWI) protocol, a 1-wire interface protocol, a JTAG protocol, a universal asynchronous receiver-transmitter (UART) protocol, a controller area network (CAN) bus protocol, and a binary protocol; for a protocol adapter to be arranged to convert the slave-side interface signals to RS-232 standard, RS-485 standard and the like; and for a protocol adapter to be arranged to convert an analogue signal of a slave device to digital data and to communicate it to the slave-side communication interface by means of a digital communication protocol.

In accordance with a further aspect of the invention there is provided a computer-implemented method for configuring a communication apparatus, the method executed at the communication apparatus and comprising:

receiving a configuration instruction at a communication controller of the apparatus, the configuration instruction including a selected communication protocol identifier;

configuring electrical pins of a slave-side communication interface of a communication controller to define a communication port and to implement a communication protocol thereon that corresponds to the communication protocol identifier, the pins of the slave-side communication interface being in electrical communication with a slave socket having a predetermined layout;

whereby communication is facilitated between the communication port and an external slave device by a protocol adapter corresponding to the selected communication protocol that is received within the slave socket.

Further features provide for the step of receiving a configuration instruction to be preceded by the step of sending an identifier of the apparatus; for the step of receiving a configuration instruction to be preceded by the step of sending a current configuration message that indicates a current slave-side communication interface configuration of the communication apparatus; and for the configuration instruction to include the apparatus identifier, the communication apparatus being arranged to identify the configuration instruction as being addressed to it by means of the apparatus identifier therein.

Further features provide for the step of configuring electrical pins of a slave-side communication interface to include configuring more than one communication port thereon; for the protocol implemented on each communication port to be selected from the group consisting of a serial peripheral interface (SPI) protocol, an inter-integrated circuit (I2C™) protocol or a two-wire interface (TWI) protocol, a 1-wire interface protocol, a JTAG protocol, a universal asynchronous receiver-transmitter (UART) protocol, a controller area network (CAN) bus protocol, and a binary protocol; for a protocol adapter to be arranged to convert the slave-side interface signals to RS-232 standard, RS-485 standard and the like; and for a protocol adapter to be arranged to convert an analogue signal of a slave device to digital data and to communicate it to the slave-side communication interface by means of a digital communication protocol.

In accordance with a further aspect of the invention there is provided a computer program product for configuring a communication apparatus, the computer program product comprising a computer-readable medium having stored computer-readable program code for performing the steps of:

sending a configuration instruction to a communication controller of the apparatus, the configuration instruction including a selected communication protocol identifier;

causing the communication controller to configure electrical pins of a slave-side communication interface thereof to define a communication port and to implement a communication protocol thereon that corresponds to the communication protocol identifier, the pins of the slave-side communication interface being in electrical communication with a slave socket having a predetermined layout;

whereby communication is facilitated between the communication port and an external slave device by a protocol adapter corresponding to the selected communication protocol that is received within the slave socket.

Further features provide for the computer-readable medium to be a non-transitory computer-readable medium and for the computer-readable program code to be executable by a processing circuit.

Embodiments of the invention will now be described, by way of example only, with reference to the accompanying drawings.

DETAILED DESCRIPTION WITH REFERENCE TO THE DRAWINGS

Figure 1:
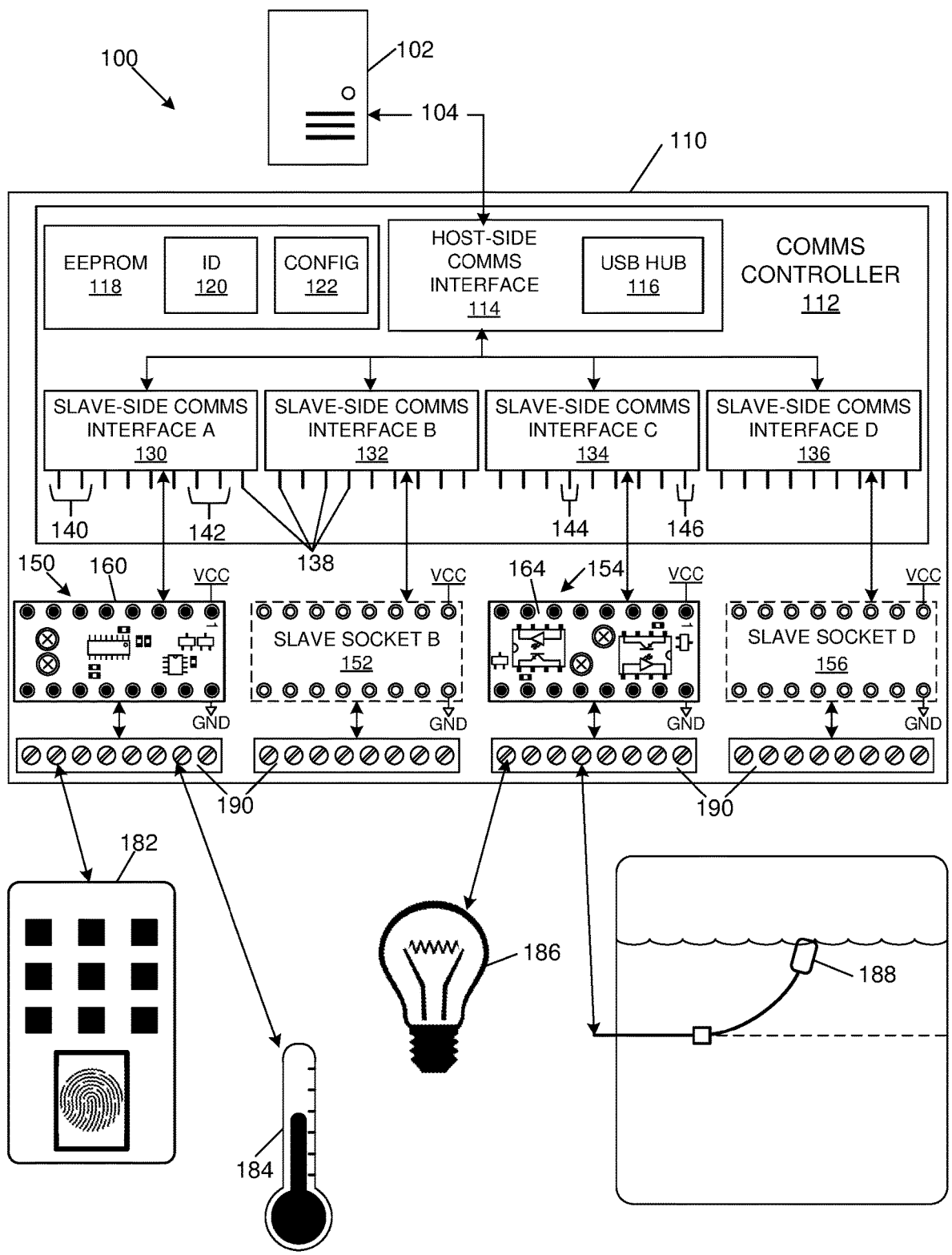
FIG. 1 is a schematic representation of a communication system in which a communication apparatus in accordance with the present invention is utilised.

Embodiments of a communication apparatus are disclosed below. The apparatus includes a communication controller which may be a purpose-built communication bridge and may be encapsulated within an integrated circuit (IC). Examples of such purpose-built communication bridges include the FT4232H USB to multipurpose UART/multi-protocol synchronous serial engine communication bridge. However, the communication controller may also be a microcontroller that, through a combination of firmware and native hardware blocks, implements the functional modules of such a communication controller. Similarly, the communication controller may be a field-programmable gate array (FPGA) or complex programmable logic device (CPLD) that implements the functionality of such a communication controller.

The communication controller includes a host-side communication interface for communicating with a host. In some embodiments the communication interface may be a wired communication interface, such as universal serial bus (USB) or a wired network connection. However, the host-side communication interface may be a wireless communication interface as well, such as Bluetooth, Wi-Fi, and the like.

The communication controller further provides one or more slave-side communication interfaces, preferably a plurality thereof. Each slave-side communication interface has a plurality of electrical pins through which the communication controller exposes the inputs to and outputs from each of the slave-side communication interfaces. Reference to a "pin" or pins in this context refers to the externally accessible electrical signals, connections, inputs and outputs of a particular electronic component and any electrical conductor extending therefrom that may facilitate electrical connection to the relevant pin or pins. The form these pins take may depend on the particular embodiment. In embodiments in which the communication controller is implemented in an IC, the form the pins take may depend on the package type of the IC. In the case of IC packages such as dual in-line packages (DIP's), these pins may be leads extending from the periphery of the IC package. However, in packages such as ball grid arrays (BGA's) or land grid arrays (LGA's) these may be conductive balls or pads.

The slave-side communication interfaces are configurable in that their pins may be grouped together to form a logical communication port, such as a serial peripheral interface (SPI) port or a universal asynchronous receiver-transmitter (UART) port. The number of pins on the slave-side communication interfaces may be numerous enough to define more than one port on a single slave-side communication interface. Furthermore, pins of different slave-side communication interfaces may be logically grouped to form a slave-side communication port, thus spanning across two or more slave-side communication interfaces.

A slave-side communication port is configured such as to implement a particular communication protocol thereon. To continue with the exemplary ports mentioned above, these protocols may therefore include the serial peripheral interface protocol (SPI) implemented on the SPI port; and a universal asynchronous receiver-transmitter (UART) protocol on the UART port. However, the term "protocol" should be interpreted to mean any manner by means of which the pins of a particular logical communication port is manipulated or read. The logical communication port may include only one pin, in which case the communication protocol implemented thereon may be binary communication protocol, i.e. 0/1; true/false or on/off, via a discrete output or a discrete input, as the case may be. Any number of communication protocols may therefore be implemented thereon.

The pins of the slave-side communication interfaces (and thus of the configured slave-side communication ports) are in electrical communication with a slave socket. In embodiments in which the components of the communication apparatus are housed on a printed circuit board (PCB), the pins may be routed to electrical contacts of the respective slave sockets.

The slave sockets may each removably receive a protocol adapter. This may be embodied on a separate PCB that terminates its electrical connections on a footprint that corresponds, at least partially, to the footprint of the slave socket. The slave socket may, for example, be two parallel rows of female headers, with the protocol adapter having male pin strips that are located thereon so as to allow mating thereof with the slave socket. Some protocol adapters may not require all the electrical connections provided by the slave socket and may then only occupy a part of the slave socket. Some protocol adapters may also have a slave device integrated therewith.

Each protocol adapter is electrically and logically positioned intermediate the slave-side communication ports and electromechanical connectors by which slave devices may be connected to the communication apparatus. The physical configuration and positioning of the actual components may however vary due to considerations such maximising the efficient us of space on a PCB. The electromechanical connectors may be screw terminals, pin headers, board-to-board connectors, board-to-cable connectors, and the like. Each protocol adapter is arranged to convert electrical signals received from a slave-side communication port, configured to implement a particular communication protocol, to electrical signals that are appropriate to the particular communication protocol.

For example, should a slave-side communication port be configured to implement a UART port, its electrical signals will generally be transistor-transistor logic (TTL) voltage levels, which uses 0 volt (V) to represent a binary zero, and 5V or 3.3V to represent a binary one, depending on such factors as the supply voltage of the communication controller. However, a slave device that communicates using the RS-232 standard, requires a binary zero to be represented using a voltage between 3V and 15V; and a binary one to be represented using a voltage between −15V and −3V. The protocol adapter for this application will therefore translate between these two sets of voltage levels to allow the slave-side communication port to communicate with a slave device connected thereto.

In some embodiments, the protocol adapter may translate other electrical characteristics, such as signal inverting, amplification and the like. In further embodiments, the protocol adapter may alter timing characteristics of a signal, such as changing the data rate or introducing a time delay in the signal. In still further embodiments, the protocol adapter may convert voltage into current and vice-verse, for example converting the output of a sensor with a 4-20 milli-Ampere (mA) output to a corresponding voltage range between 0V and 10V. In yet further embodiments, the protocol adapter may convert serialised data to parallel data and vice versa. It will be apparent to those skilled in the art that numerous further signal translations may be implemented with a particular protocol adapter.

Besides having the same mechanical footprint, the slave sockets each has a predetermined layout corresponding to the layout of the other slave sockets. That is to say that certain pins of the slave sockets have predefined signal locations. For example, pin number 1 on all the sockets may be 5V, pins 2 through 9 may be routed to corresponding pins 1 through 8 of a relevant slave-side communication interface, and pin 10 connected to ground. The layout of the pins on the various protocol adapters may therefore follow this predetermined layout, which may allow the various protocol adapters to be interchangeable between the different slave sockets, or at least on some of the slave sockets.

Data may be sent to the communication apparatus from a host, via the host-side communication interface, indicating a particular slave-side communication port (and by association a particular slave device connected thereto) that the data is to be communicated to. The host-side communication interface may then direct the data to the indicated slave-side communication port which, in turn, transmits the data via the relevant port. The transmitted data is intercepted by the relevant protocol adapter to convert the signals to voltage levels (and possibly other signal characteristics) expected by the relevant slave device.

Similarly, however in the reverse direction, data transmitted by a slave device will be intercepted by the relevant protocol adapter to convert the signals to voltage levels, etc. expected by the relevant slave-side communication port. The slave-side communication interface or interfaces on which the relevant communication port is defined may then forward the data received from the slave device to the host-side communication interface indicating the communication port (and by association the slave device) from which the data originates. The host-side communication interface may then forward the data to the host. Data from the slave devices may be sent in this manner to the host in an asynchronous manner, i.e. if and when data is received from a slave device or if a signal state of a slave device changes. Alternatively, the communication controller may send the states of slave device data lines to the host periodically. Further alternatively, the host may prompt the communication device to the states of the slave device data lines periodically or asynchronously.

FIG. 1 shows an example embodiment of a system (100) wherein such a communication apparatus (150) may be utilised. The system (100) includes a host (102) which, in the present embodiment, is an Internet of Things (IoT) edge router and is in data communication with the communication apparatus (150) through a USB cable (104).

The communication apparatus (110) has a communication controller (112) which, in the present embodiment, is an FTDI FT4232 IC. The communication controller (112) has a host-side communication interface (114) for communicating with the host (102) through the USB cable (104). The host-side communication interface (114) is provided with a powered USB hub (116) allowing further communication apparatuses (110) to be connected to the same USB bus, facilitated by USB connectors on the communication apparatus (110) that are in communication to the USB hub (116). In order to allow the host (102) to differentiate between different communication apparatuses (110) that are connected to the same USB bus, the communication apparatus (110) is provided with an EEPROM (118) having an identifier (120) stored thereon. The identifier (120) may therefore be prompted by the host (102) to facilitate identification of a particular communication apparatus (110).

The communication controller (112) furthermore has a plurality of slave-side communication interfaces, four slave-side communication interfaces (130, 132, 134, 136) in the present embodiment shown as slave-side communication interface "A" through "D" in FIG. 1. The host-side communication interface (114) is in data communication with each of the slave-side communication interfaces (130, 132, 134, 136).

Each slave-side communication interface (130, 132, 134, 136) has a plurality of electrical pins (138), 8 pins in the present embodiment. The pins (138) are configurable to define a communication port by logically grouping a number of pins together and implementing a particular communication protocol thereon. In FIG. 1, four communication ports (140, 142, 144, 146) have been defined. The first configured communication port (140) is defined on the pins of slave-side communication interface "A" (130) and comprises two pins grouped together and the UART (serial port) communication protocol has been implemented thereon. The pins of this first communication port (140) represent the two signals of a simple serial port, i.e. transmit (TX) and receive (RX). The second configured communication port (142) is defined on two pins of slave-side communication interface "A" (130) and defines an I²C communication port with an I²C communication protocol implemented thereon. The pins of the second communication port (142) represent the two signals of an I²C port, i.e. serial data (SDA) and serial clock (SCL). The third configured communication port (144) is defined on a single pin of slave-side communication interface "C" (134) and is a single digital output, implementing a binary communication protocol on thereon. The fourth configured communication port (146) is also defined on a single pin of slave-side communication interface "C" (134) and is a single digital input, also implementing a binary communication protocol on thereon.

Although a serial port (140), a 2-Wire port (142), a discrete digital output port (144) and a discrete digital input port (146) are shown in FIG. 1, this is merely an exemplary configuration and any number of communication ports with their corresponding protocols may be configured. For example, the ports that may be defined and their corresponding protocols may further include serial peripheral interface (SPI), 1-Wire interface, JTAG, controller area network (CAN) bus, and the like.

The communication apparatus (110) furthermore has four slave sockets ("A" through" "D") (150, 152, 154, 156) and the electrical connections of each of the respective slave sockets are in electrical communication with the pins (138) on their corresponding slave-side communication interface (130, 132, 134, 136). The slave sockets (150, 152, 154, 156)

are arranged to allow each of them to removably receive a protocol adapter therein. Slave socket "A" (150) and slave socket "C" (154) in FIG. 1 each has a protocol adapter (160, 164) received therein, the functionality of which will be discussed below.

The slave sockets (150, 152, 154, 156) are configured to have a predetermined layout. That is to say that a standard footprint and pin layout is adopted for each slave socket and thus the protocol adapters (160, 164) that are to be received therein. In the present embodiment, pin number one of each socket is provided with a 5V supply voltage (VCC) and pin number 16 is provided with a ground connection (GND). Each protocol adapter adopts the same layout and routes its respective VCC and GND connections to its own pin 1 and 16, respectively. Similarly, the data lines extending between the respective slave-side communication interfaces (130, 132, 134, 136) and its corresponding slave socket (150, 152, 154, 156) are routed to predetermined pin positions and the convention is followed on each of the protocol adapters (160, 164). This allows the protocol adapters (160, 164) to be interchangeable between slave sockets (150, 152, 154, 156), or at least interchangeable between a subset of the slave sockets.

The communication apparatus (110) is arranged to allow each slave-side communication interface (130, 132, 134, 136) to be configurable in the manner described above on the fly. This is to say that these configurations need not only take place upon power-up or reset of the communication apparatus (110). This configuration can be performed at any time after power-up or reset thereof. It can therefore be said that the communication ports (140, 142, 144, 146) are dynamically configurable. In the present embodiment, however, the communication apparatus (110) is provided with an EEPROM (118) to allow a particular port configuration to be saved in a non-volatile manner. Therefore, the communication apparatus (110) is capable of restoring its port configuration (122) to a previously defined configuration after a subsequent start-up or reset.

FIG. 1 shows four slave devices connected to the communication apparatus (110). These slave devices are a fingerprint scanner (182), a digital thermometer (184), a relay (controlling a lightbulb) (186) and a float switch (188) in a water tank. The slave devices (182, 184, 186, 188) are electrically connected to the communication apparatus (110) through electromechanical connectors, screw terminals (190) in the present embodiment. The respective terminals of each of the screw terminals (190) are, in turn, electrically connected to the respective slave sockets (150, 152, 154, 156) and thus to the corresponding protocol adapters (160, 164) when received therein.

The fingerprint scanner (182) communicates through a serial port with the RS-232 standard. The protocol adapter (160) in slave socket A (150) is therefore provided with a level shifter, such as a MAX-232 from Maxim Integrated™ to convert between RS-232 voltage levels and TTL voltage levels to allow the first communication port (140) to communicate with the fingerprint scanner (182).

The digital thermometer (184) is a DS18B20, also from Maxim Integrated™, and communicates with a 1-Wire communication protocol. However, the protocol adapter (160) may be provided with a 1-Wire master IC, such as the DS2482-100 from Maxim Integrated™ to convert between the 1-Wire protocol of the thermometer (184) and the I²C™ protocol implemented on the second communication port.

The protocol adapter (164) that is received in slave socket "C" (154) has been provided with optically isolated input and output circuitry. This enables the third communication port (144) to, via the protocol adapter (164), turn on the relay (186) and in turn the lightbulb it controls by manipulating the digital output port (144). Similarly, the fourth communication port (146), being a digital input port, may sense the state of the float switch (188) via the protocol adapter (164), thereby determining whether the water level in a tank is above or below a particular level. The third communication port (144) and the fourth communication port (146) therefore communicate using a binary (on/off) protocol.

It will be apparent to those skilled in the art that numerous slave devices may be communicated with and/or controlled in this manner by configuring an appropriate communication port, implementing the appropriate protocol thereon, and providing the appropriate protocol adapter in the slave socket intermediate the slave-side communication interfaces and the slave devices.

Figure 2:
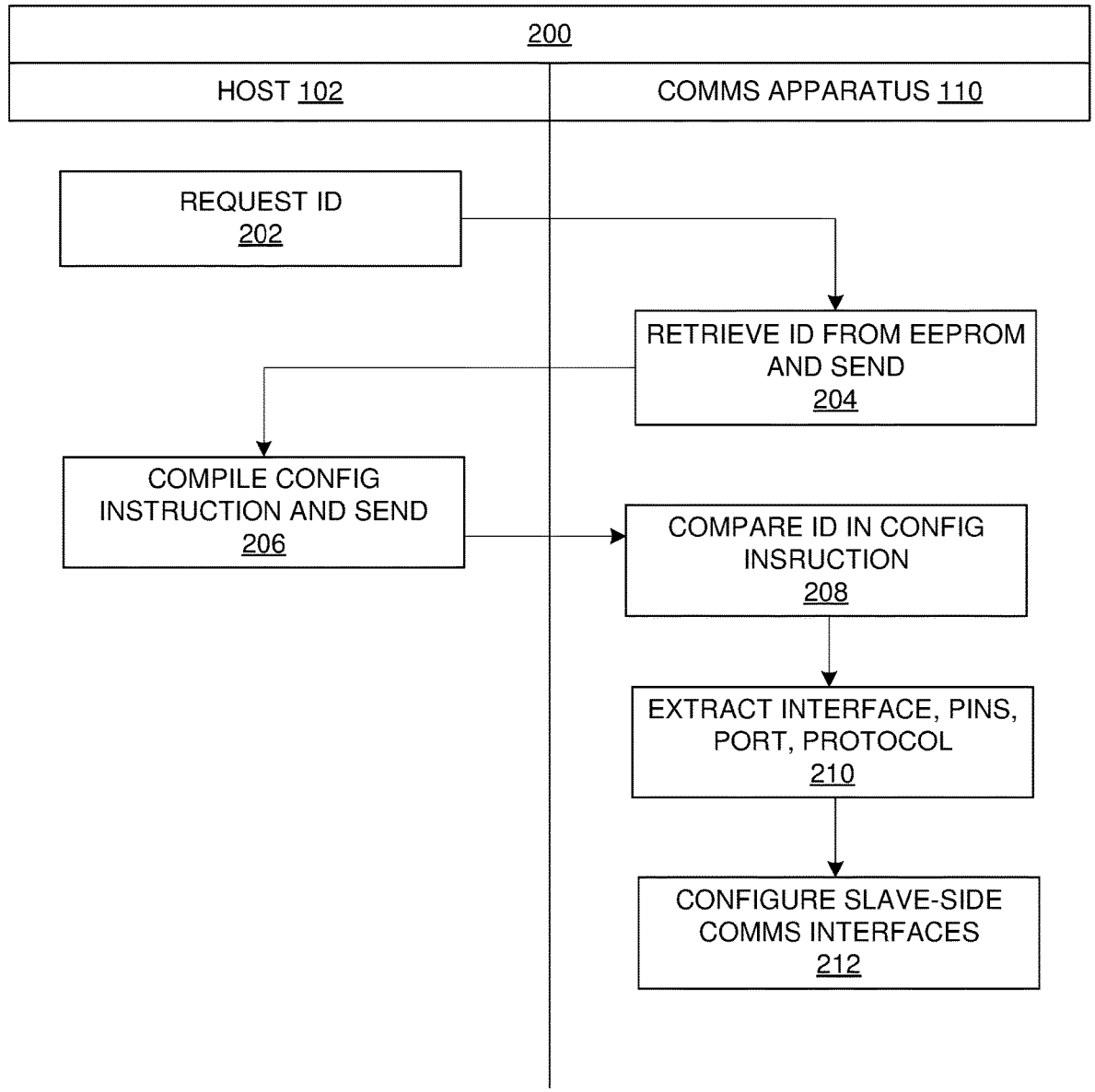
FIG. 2 is a swim-lane flow diagram of a method of configuring the communication apparatus of FIG. 1.

The system (100) described above may implement a method for configuring a communication apparatus in accordance with the invention. An exemplary method (200) for configuring a communication apparatus (110) is illustrated in the swim-lane flow diagram of FIG. 2 in which respective swim-lanes delineate steps, operations or procedures performed by respective entities or devices.

As a first step, the host (102) requests (202) an identifier from the communication apparatus (110) via the USB cable (104). The communication apparatus receives the request at its host-side communication interface (114) and retrieves (204) its identifier (120) from the on-board EEPROM (118). The communication apparatus (110) sends the retrieved identifier to the host (102).

The host (102) then compiles (206) a configuration instruction. The configuration instruction includes the received identifier, the required ports, the pin numbers, on which slave-side communication interface the respective ports must be configured, as well as the required communication protocol of each. The required communication protocol may be implicit in the particular port. After compiling the configuration instruction, the host (102) sends the configuration instruction to the communication apparatus (110).

Upon receiving the configuration instruction, the communication apparatus (110) extracts the identifier from the instruction and compares (208) the identifier in the configuration instruction to the identifier (120) stored on its EEPROM (118). If not a match, the communication apparatus (110) ignores the configuration instruction since it is intended for another communication apparatus on the same USB bus. It the identifiers match, the communication controller will extract (210) the information in the configuration instruction and configure (212) the slave-side communication interfaces to have the required ports on the required pins.

The invention therefore provides a versatile communication device that enables numerous devices to be controlled or monitored thereby, or to be communicated therewith. This, in turn, allows these (often legacy) devices to become end-nodes on an IoT edge gateway so as to allow the end-nodes to become a part of the Internet of Things via an IoT edge gateway. It furthermore allows the expansion of the interfacing capacity of commercially available edge gateways.

Figure 3:
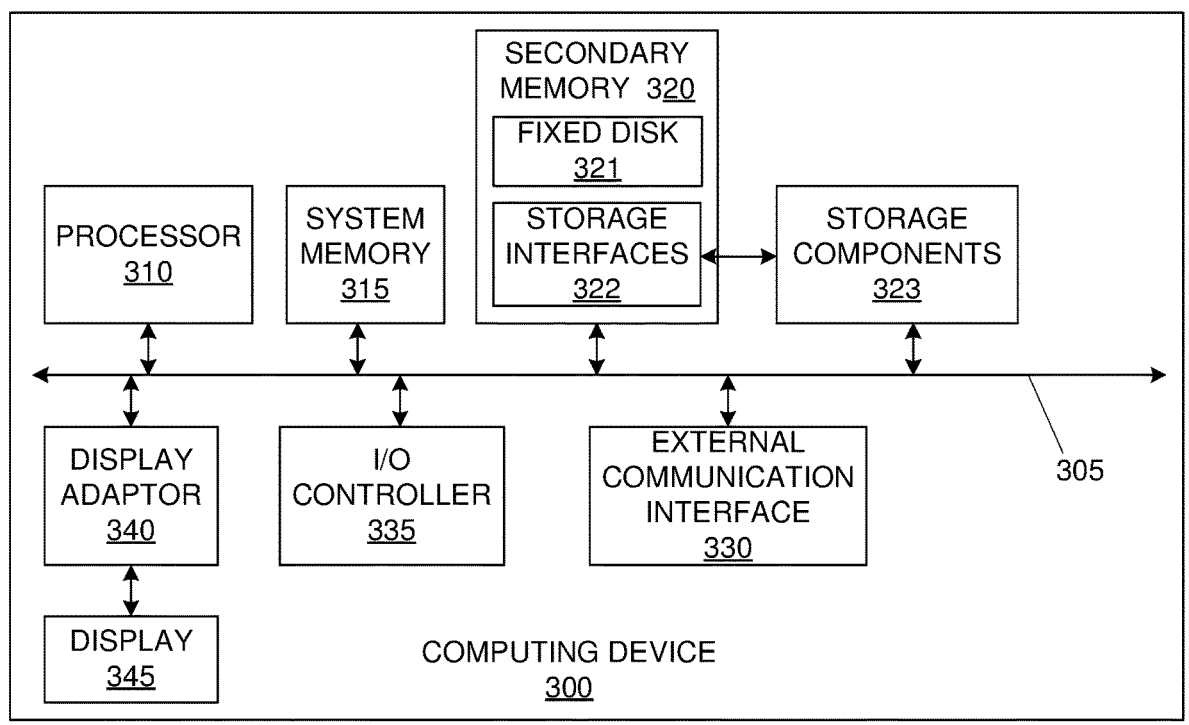
FIG. 3 illustrates an example of a computing device in which various aspects of the disclosure may be implemented.

FIG. 3 illustrates an example of a computing device (300) in which various aspects of the disclosure may be implemented. The computing device (300) may be embodied as any form of data processing device including a personal computing device (e.g. laptop or desktop computer), a server computer (which may be self-contained, physically distributed over a number of locations), a client computer, or a communication device, such as a mobile phone (e.g. cellular telephone), satellite phone, tablet computer, personal digital assistant or the like. Different embodiments of the computing device may dictate the inclusion or exclusion of various components or subsystems described below.

The computing device (300) may be suitable for storing and executing computer program code. The various participants and elements in the previously described system diagrams may use any suitable number of subsystems or components of the computing device (300) to facilitate the functions described herein. The computing device (300) may include subsystems or components interconnected via a communication infrastructure (305) (for example, a communications bus, a network, etc.). The computing device (300) may include one or more processors (310) and at least one memory component in the form of computer-readable media. The one or more processors (310) may include one or more of: CPUs, graphical processing units (GPUs), microprocessors, field programmable gate arrays (FPGAs), application specific integrated circuits (ASICs) and the like. In some configurations, a number of processors may be provided and may be arranged to carry out calculations simultaneously. In some implementations various subsystems or components of the computing device (300) may be distributed over a number of physical locations (e.g. in a distributed, cluster or cloud-based computing configuration) and appropriate software units may be arranged to manage and/or process data on behalf of remote devices.

The memory components may include system memory (315), which may include read only memory (ROM) and random-access memory (RAM). A basic input/output system (BIOS) may be stored in ROM. System software may be stored in the system memory (315) including operating system software. The memory components may also include secondary memory (320). The secondary memory (320) may include a fixed disk (321), such as a hard disk drive, and, optionally, one or more storage interfaces (322) for interfacing with storage components (323), such as removable storage components (e.g. magnetic tape, optical disk, flash memory drive, external hard drive, removable memory chip, etc.), network attached storage components (e.g. NAS drives), remote storage components (e.g. cloud-based storage) or the like.

The computing device (300) may include an external communications interface (330) for operation of the computing device (300) in a networked environment enabling transfer of data between multiple computing devices (300) and/or the Internet. Data transferred via the external communications interface (330) may be in the form of signals, which may be electronic, electromagnetic, optical, radio, or other types of signal. The external communications interface (330) may enable communication of data between the computing device (300) and other computing devices including servers and external storage facilities. Web services may be accessible by and/or from the computing device (300) via the communications interface (330).

The external communications interface (330) may be configured for connection to wireless communication channels (e.g., a cellular telephone network, wireless local area network (e.g. using Wi-Fi™), satellite-phone network, Satellite Internet Network, etc.) and may include an associated wireless transfer element, such as an antenna and associated circuitry.

The computer-readable media in the form of the various memory components may provide storage of computer-executable instructions, data structures, program modules, software units and other data. A computer program product may be provided by a computer-readable medium having stored computer-readable program code executable by the central processor (310). A computer program product may be provided by a non-transient computer-readable medium, or may be provided via a signal or other transient means via the communications interface (330).

Interconnection via the communication infrastructure (305) allows the one or more processors (310) to communicate with each subsystem or component and to control the execution of instructions from the memory components, as well as the exchange of information between subsystems or components. Peripherals (such as printers, scanners, cameras, or the like) and input/output (I/O) devices (such as a mouse, touchpad, keyboard, microphone, touch-sensitive display, input buttons, speakers and the like) may couple to or be integrally formed with the computing device (300) either directly or via an I/O controller (335). One or more displays (345) (which may be touch-sensitive displays) may be coupled to or integrally formed with the computing device (300) via a display (345) or video adapter (340).

Any of the steps, operations, components or processes described herein may be performed or implemented with one or more hardware or software units, alone or in combination with other devices. In one embodiment, a software unit is implemented with a computer program product comprising a non-transient computer-readable medium containing computer program code, which can be executed by a processor for performing any or all of the steps, operations, or processes described. Software units or functions described in this application may be implemented as computer program code using any suitable computer language such as, for example, Java™, C++, or Perl™ using, for example, conventional or object-oriented techniques. The computer program code may be stored as a series of instructions, or commands on a non-transitory computer-readable medium, such as a random access-memory (RAM), a read-only memory (ROM), a magnetic medium such as a hard-drive, or an optical medium such as a CD-ROM. Any such computer-readable medium may also reside on or within a single computational apparatus, and may be present on or within different computational apparatuses within a system or network.

Flowchart illustrations and block diagrams of methods, systems, and computer program products according to embodiments are used herein. Each block of the flowchart illustrations and/or block diagrams, and combinations of blocks in the flowchart illustrations and/or block diagrams, may provide functions which may be implemented by computer readable program instructions. In some alternative implementations, the functions identified by the blocks may take place in a different order to that shown in the flowchart illustrations.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. The described operations may be embodied in software, firmware, hardware, or any combinations thereof.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

Finally, throughout the specification and claims unless the contents requires otherwise the word 'comprise' or variations such as 'comprises' or 'comprising' will be understood to imply the inclusion of a stated integer or group of integers but not the exclusion of any other integer or group of integers.

The invention claimed is:

1. A communication apparatus including a communication controller having a host-side communication interface for communicating with a host and a plurality of slave-side communication interfaces, each slave-side communication interface having a plurality of electrical pins that are configurable to define a communication port that implements a selected communication protocol thereon, and each pin further being in electrical communication with a slave socket having a predetermined layout,
wherein each slave socket is configured to removably receive a protocol adapter that corresponds to the selected communication protocol, the protocol adapter being configured to facilitate communication between an external slave device and the defined communication port, wherein a footprint of each slave socket is configured to at least partially correspond to the layout of the protocol adapter, such that the protocol adapter is interchangeable between at least a subset of the slave sockets.

2. The communication apparatus as claimed in claim 1 wherein the communication controller is configured to send data received through the host-side communication interface to a particular slave-side communication interface port for sending to a slave device; and wherein the communication controller is configured to send data received from a slave device through a slave-side port to the host-side communication interface for sending to a host.

3. The communication apparatus as claimed in claim 1 wherein the communication controller is a microprocessor that is configured to implement a plurality of slave-side communication interfaces thereon or wherein the communication controller is a communication bridge integrated circuit.

4. The communication apparatus as claimed in claim 1 wherein each slave-side communication interface is configurable to define a communication port that implements a selected communication protocol thereon on the fly.

5. The communication apparatus as claimed in claim 1 wherein the communication controller is in communication with a non-volatile electronic memory for storage of a particular communication interface configuration.

6. The communication apparatus as claimed in claim 1 wherein the communication controller is arranged to restore a stored communication interface configuration at start-up.

7. The communication apparatus as claimed in claim 1 wherein the host-side communication interface is a Universal Serial Bus (USB) interface.

8. The communication apparatus as claimed in claim 1 wherein a slave-side communication interface is configurable to define more than one communication port.

9. The communication apparatus as claimed in claim 1 wherein the selected communication protocol implemented on each communication port defined on each of the slave-side communication interfaces is selected from the group consisting of: a serial peripheral interface (SPI) protocol, an inter-integrated circuit ($I^2C^{TM}$) protocol or a two-wire interface (TWI) protocol, 1-wire interface protocol, a JTAG protocol, a universal asynchronous receiver-transmitter (UART) protocol, a controller area network (CAN) bus protocol, and a binary protocol.

10. The communication apparatus as claimed in claim 1 wherein a protocol adapter is arranged to convert the slave-side interface signals to RS-232 standard or RS-485 standard.

11. The communication apparatus as claimed in claim 1 wherein a protocol adapter is arranged to convert an analogue signal of a slave device to digital data and to communicate it to the slave-side communication interface by means of a digital communication protocol.

12. The communication apparatus as claimed in claim 1 wherein each protocol adapter is arranged to convert communication signals of a slave device so as to be electrically compatible with relevant slave-side communication interfaces and vice versa.

13. The communication apparatus as claimed in claim 1 wherein a slave-side facing section of the slave socket is in electrical communication with an electromechanical connector to allow a slave device to be electrically connected thereto.

14. A computer-implemented method for configuring a communication apparatus, the method executed at a host and comprising:
sending a configuration instruction to a communication controller of the apparatus, the configuration instruction including a selected communication protocol identifier; and
causing the communication controller to configure electrical pins of a slave-side communication interface thereof to define a communication port and to implement a communication protocol thereon that corresponds to the communication protocol identifier, the pins of the slave-side communication interface being in electrical communication with a slave socket having a predetermined layout;
whereby communication is facilitated between the communication port and an external slave device by a protocol adapter corresponding to the selected communication protocol that is removably received within the slave socket, wherein a footprint of each slave socket is configured to at least partially correspond to the layout of the protocol adapter, such that the protocol adapter is interchangeable between at least a subset of the slave sockets.

15. A computer-implemented method for configuring a communication apparatus, the method executed at the communication apparatus and comprising:
receiving a configuration instruction at a communication controller of the apparatus, the configuration instruction including a selected communication protocol identifier; and
configuring electrical pins of a slave-side communication interface of a communication controller to define a communication port and to implement a communication protocol thereon that corresponds to the communication protocol identifier, the pins of the slave-side communication interface being in electrical communication with a slave socket having a predetermined layout;

whereby communication is facilitated between the communication port and an external slave device by a protocol adapter corresponding to the selected communication protocol that is removably received within the slave socket, wherein a footprint of each slave socket is configured to at least partially correspond to the layout of the protocol adapter, such that the protocol adapter is interchangeable between at least a subset of the slave sockets.

16. The communication apparatus as claimed in claim 7 wherein the USB host-side communication interface provides a USB hub to facilitate the connection of further USB devices to a same USB bus.

17. The communication apparatus as claimed in claim 1 wherein the communication controller has an identifier stored thereon to enable a host to identify the communication controller as a particular apparatus to be configured.

* * * * *